United States Patent
Toledano et al.

(10) Patent No.: US 12,204,873 B1
(45) Date of Patent: Jan. 21, 2025

(54) SYSTEMS AND METHODS FOR MERGING DATASETS

(71) Applicant: Anaplan, Inc., San Francisco, CA (US)

(72) Inventors: Adar Toledano, Savyon (IL); Keren Ben Tov Sher, Even Yehuda (IL); Ruth Barel, Kfar sava (IL); Yam Kaspi, Mishmeret (IL); Ofir Itzhaky, Kiryat Ono (IL)

(73) Assignee: ANAPLAN, INC., San Francisco, CA (US)

( * ) Notice: Subject to any disclaimer, the term of this patent is extended or adjusted under 35 U.S.C. 154(b) by 0 days.

(21) Appl. No.: 17/901,604

(22) Filed: Sep. 1, 2022

(51) Int. Cl.
  *G06F 16/00* (2019.01)
  *G06F 7/14* (2006.01)
  *G06F 16/28* (2019.01)

(52) U.S. Cl.
  CPC .............. *G06F 7/14* (2013.01); *G06F 16/285* (2019.01)

(58) Field of Classification Search
  None
  See application file for complete search history.

(56) References Cited

U.S. PATENT DOCUMENTS

2009/0254588 A1* 10/2009 Li ..................... G06F 16/283
2019/0347347 A1* 11/2019 Griffith ................ G06F 16/25

* cited by examiner

*Primary Examiner* — Anhtai V Tran
(74) *Attorney, Agent, or Firm* — Chamberlain, Hrdlicka, White, Williams & Aughtry; Aly Dossa

(57) ABSTRACT

A method for merging data includes: obtaining an existing dataset and a new dataset; grouping the new dataset and the existing dataset based on data types to obtain a plurality of data type groups; performing data type specific processing to generate similarity features; generating a plurality of similarity matrices using the similarity features; performing a comparison between the existing dataset and the new dataset using optimization and the plurality of similarity matrices to identify mappings between the existing dataset and the new dataset; performing data type specific validation to obtain an updated existing dataset, an updated new dataset, matches, partial matches, and new items; obtaining user preferences associated with the mappings, the matches, the partial matches, and the new items; and generating merged data using the updated existing dataset, the updated new dataset, the mappings, the matches, the partial matches, the new items, and the user preferences.

17 Claims, 9 Drawing Sheets

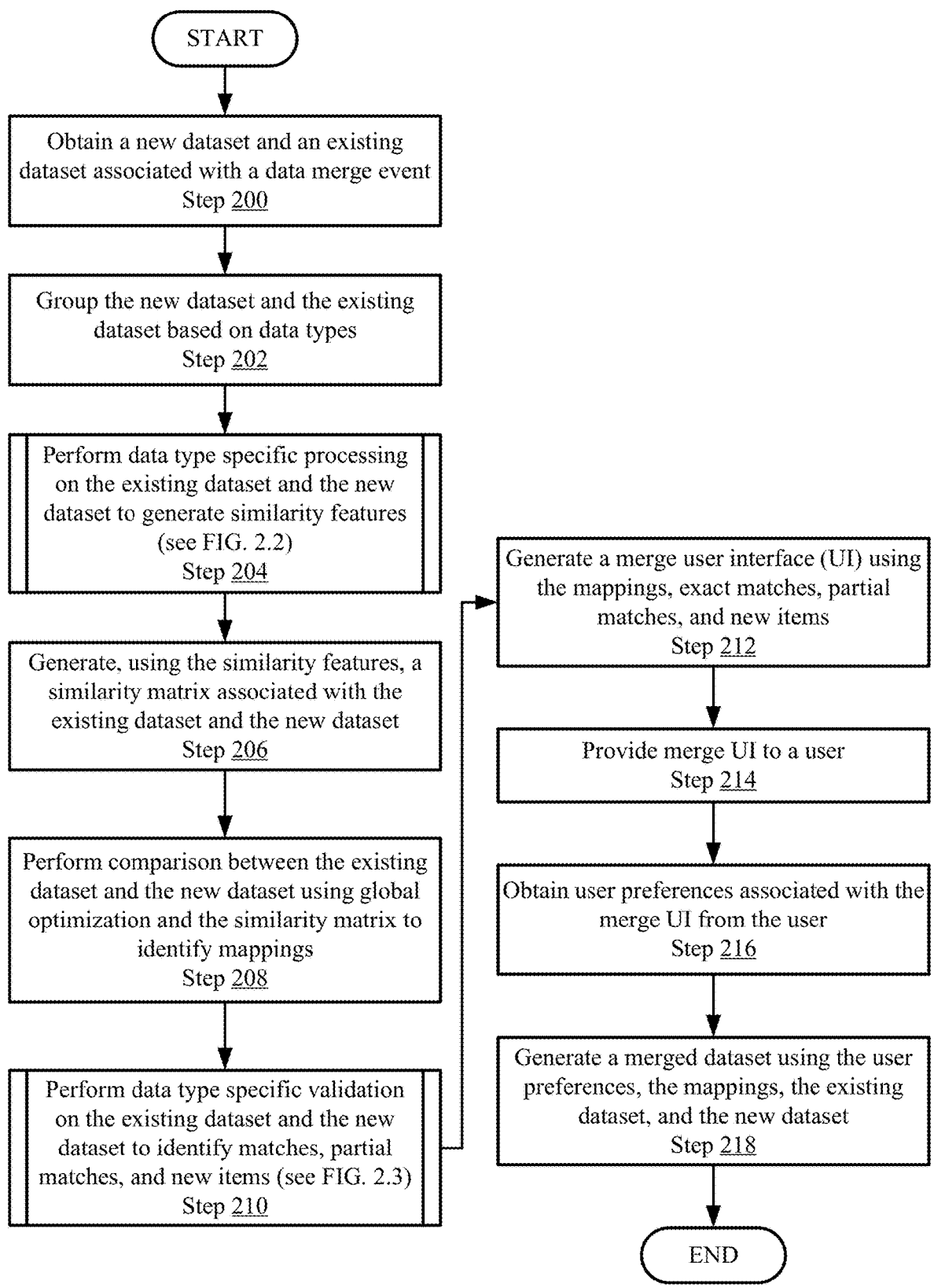
FIG. 2.1

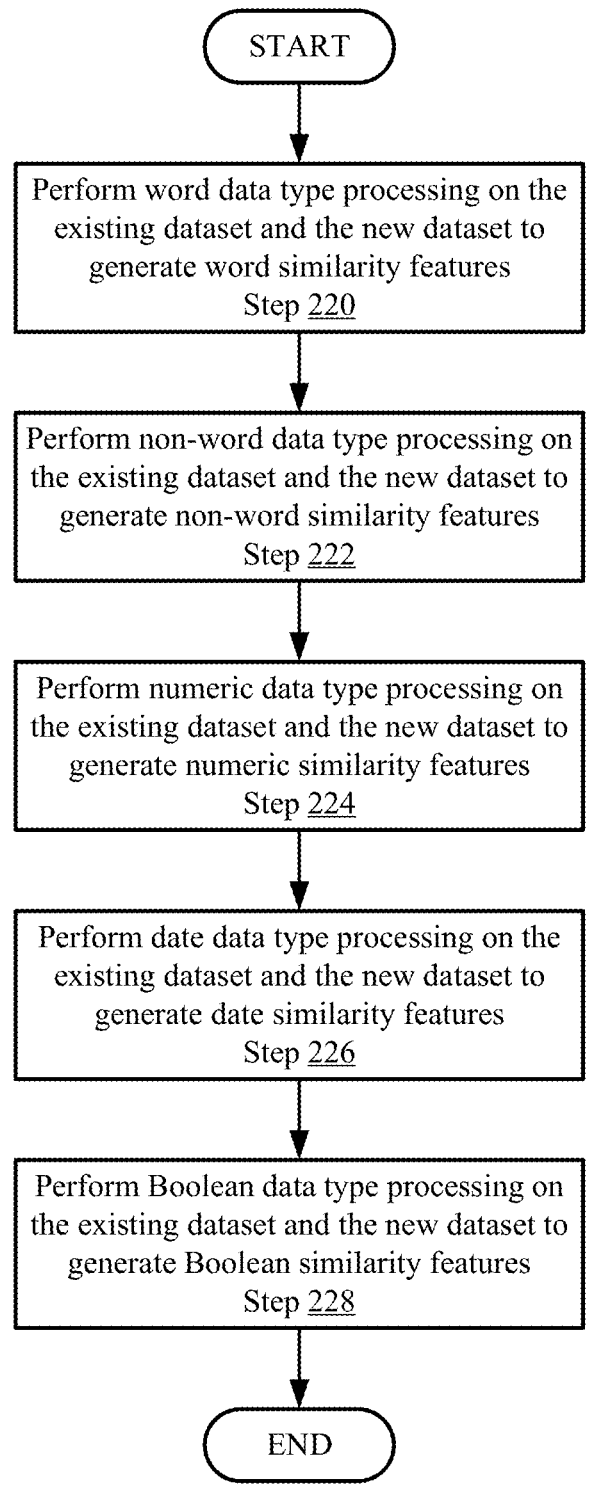
FIG. 2.2

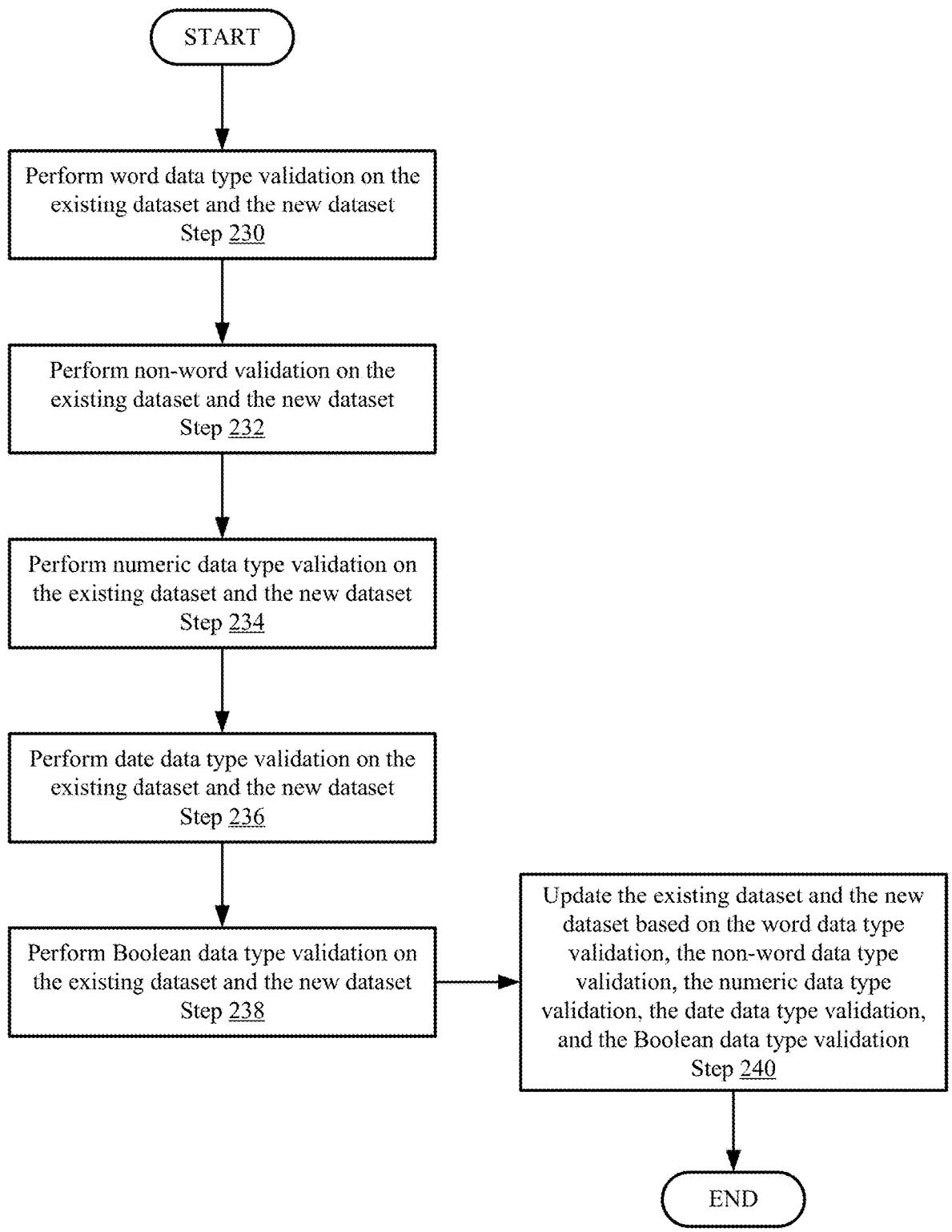
FIG. 2.3

Existing Dataset 300 →

| Company Name | State | Country | Close Date | Booking Amount |
|---|---|---|---|---|
| Company A | Texas | United States | 02/05/21 | $201,006.89 |
| Company B | Florida | United States | 03/06/21 | $513,521.00 |
| Company C | New York | United States | 11/21/20 | $752,698.54 |
| Company D | | Germany | 08/10/19 | $123,457.63 |
| Company E | | Italy | 09/10/21 | $458,123.45 |

FIG. 3.1

New Dataset 302 →

| Customer | State | Country | Date | Sale Value |
|---|---|---|---|---|
| Company A | TX | US | 20/02/2021 | 301,006.8900 |
| Company G | CA | US | 26/03/2021 | 613,521.0000 |
| Company H | NJ | US | 21/11/2020 | 852,698.5400 |
| Company I | | Itily | 22/12/2021 | 652,697.5400 |

FIG. 3.2

|  | 1 | 2 |
|---|---|---|
| 1* | 1 | 3 |
| 2* | 2 | 16 |

Example Similarity Matrix 304

FIG. 3.3

| Company Name | State | Country | Close Date | Booking Amount |
|---|---|---|---|---|
| Company A | Texas | United States | 02/05/21 | $201,006.89 |
| Company B | Florida | United States | 03/06/21 | $513,521.00 |
| Company C | New York | United States | 11/21/20 | $752,698.54 |
| Company D |  | Germany | 08/10/19 | $123,457.63 |
| Company E |  | Italy | 09/10/21 | $458,123.45 |
| Company A | Texas | United States | 02/20/21 | $301,006.89 |
| Company G | California | United States | 03/26/21 | $613,521.00 |
| Company H | New Jersey | United States | 11/21/20 | $852,698.54 |
| Company I |  | Italy | 12/22/21 | $652,697.54 |

Merged Dataset 306

FIG. 3.4

| Source file column | Target module dimension | Matches | New items | Partial matches |
|---|---|---|---|---|
| ● City ⊙ | → Location | 50 | 2 | 1 |
| ● Product name | → Products | 51 | 1 | 1 |
| ● Accounts | → Line items | 2 | 0 | 0 |
| ● Column headers | → Time | 24 | 0 | 0 |

× 1 Unmapped column

FIG. 3.5

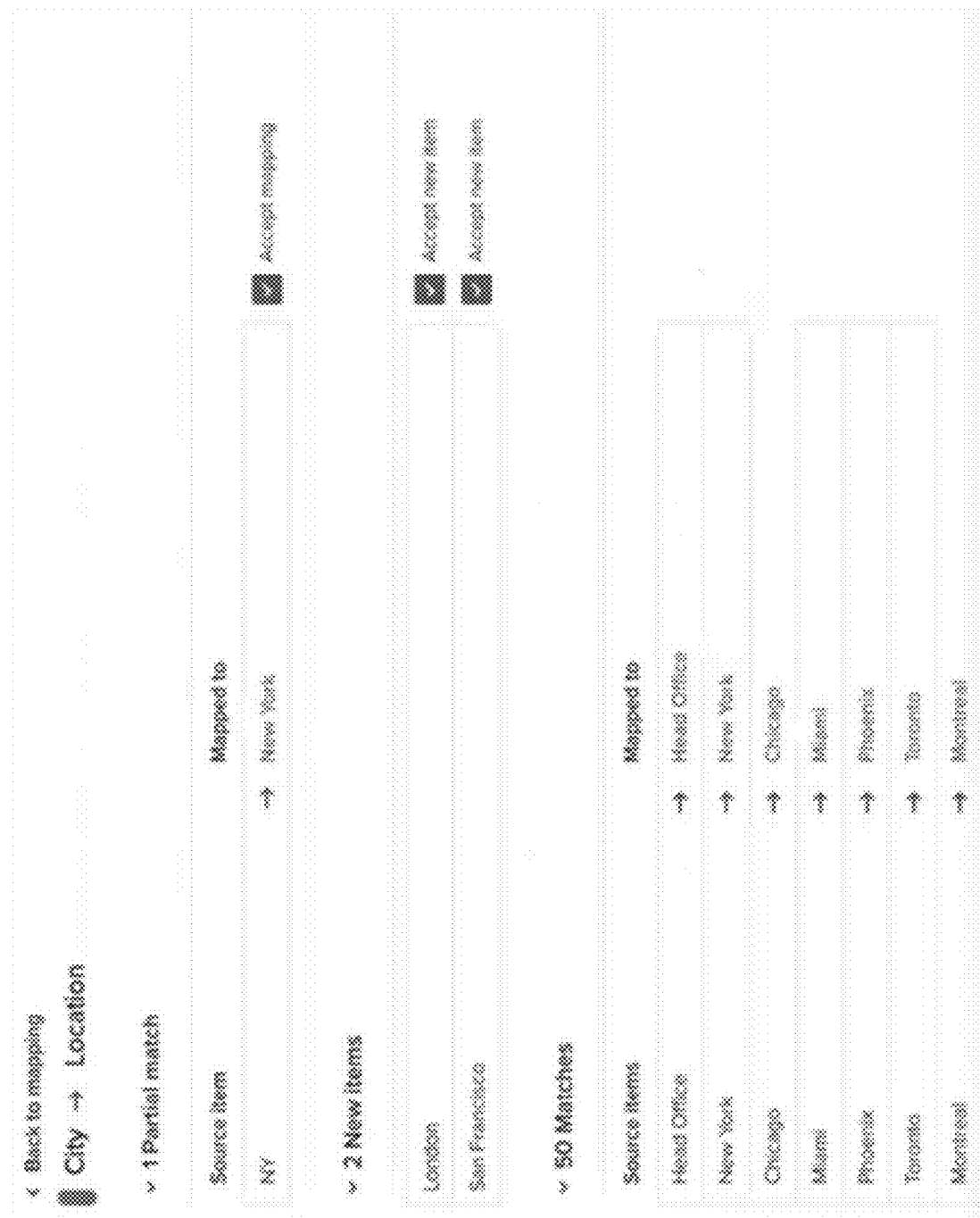
FIG. 3.6

SYSTEMS AND METHODS FOR MERGING DATASETS

BACKGROUND

A user may desire to merge the data of one data source into the data of another data source. However, the data may be arranged categorically in the two data sources, with each column including a specific category of data. The two data sources may include the same or similar data in different categories. As a result, users may desire to arrange the merged data in a way that includes similar or the same category of data between the two data sources in the same columns of the merged data.

SUMMARY

In general, certain embodiments described herein relate to a method for merging data, the method comprising: obtaining an existing dataset and a new dataset associated with a dataset merge event; grouping the new dataset and the existing dataset based on data types to obtain a plurality of data type groups; performing, for each data type group of the plurality of data type groups, data type specific processing to generate similarity features; generating, for each data type group of the plurality of data type groups, a plurality of similarity matrices using the similarity features; performing, for each data type group of the plurality of data type groups, a comparison between the existing dataset and the new dataset using optimization and the plurality of similarity matrices to identify mappings between the existing dataset and the new dataset; performing, for each data type group of the plurality of data type groups, data type specific validation to obtain an updated existing dataset, an updated new dataset, matches, partial matches, and new items; obtaining user preferences associated with the mappings, the matches, the partial matches, and the new items associated with the plurality of data type groups; and generating merged data using the updated existing dataset, the updated new dataset, the mappings, the matches, the partial matches, the new items, and the user preferences.

In general, certain embodiments described herein relate to a non-transitory computer readable medium (CRM) comprising computer readable program code, which when executed by a computer processor enables the computer processor to perform a method for merging data. The method comprising: obtaining an existing dataset and a new dataset associated with a dataset merge event; grouping the new dataset and the existing dataset based on data types to obtain a plurality of data type groups; performing, for each data type group of the plurality of data type groups, data type specific processing to generate similarity features; generating, for each data type group of the plurality of data type groups, a plurality of similarity matrices using the similarity features; performing, for each data type group of the plurality of data type groups, a comparison between the existing dataset and the new dataset using optimization and the plurality of similarity matrices to identify mappings between the existing dataset and the new dataset; performing, for each data type group of the plurality of data type groups, data type specific validation to obtain an updated existing dataset, an updated new dataset, matches, partial matches, and new items; obtaining user preferences associated with the mappings, the matches, the partial matches, and the new items associated with the plurality of data type groups; and generating merged data using the updated existing dataset, the updated new dataset, the mappings, the matches, the partial matches, the new items, and the user preferences.

In general, certain embodiments described herein relate to a computing device configured for merging data. The computing device comprises: a memory; and a processor coupled to the memory. The processor is configured to: obtain an existing dataset and a new dataset associated with a dataset merge event; group the new dataset and the existing dataset based on data types to obtain a plurality of data type groups; perform, for each data type group of the plurality of data type groups, data type specific processing to generate similarity features; generate, for each data type group of the plurality of data type groups, a plurality of similarity matrices using the similarity features; perform, for each data type group of the plurality of data types groups, a comparison between the existing dataset and the new dataset using optimization and the plurality of similarity matrices to identify mappings between the existing dataset and the new dataset; perform, for each data type group of the plurality of data type groups, data type specific validation to obtain an updated existing dataset, an updated new dataset, matches, partial matches, and new items; obtain user preferences associated with the mappings, the matches, the partial matches, and the new items associated with the plurality of data type groups; and generate merged data using the updated existing dataset, the updated new dataset, the mappings, the matches, the partial matches, the new items, and the user preferences.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of embodiments disclosed herein by way of example and are not meant to limit the scope of the claims.

FIGS. 2.1-2.3 show flowcharts in accordance with one or more embodiments.

FIGS. 3.1-3.6 show examples in accordance with one or more embodiments.

DETAILED DESCRIPTION

Figure 1:
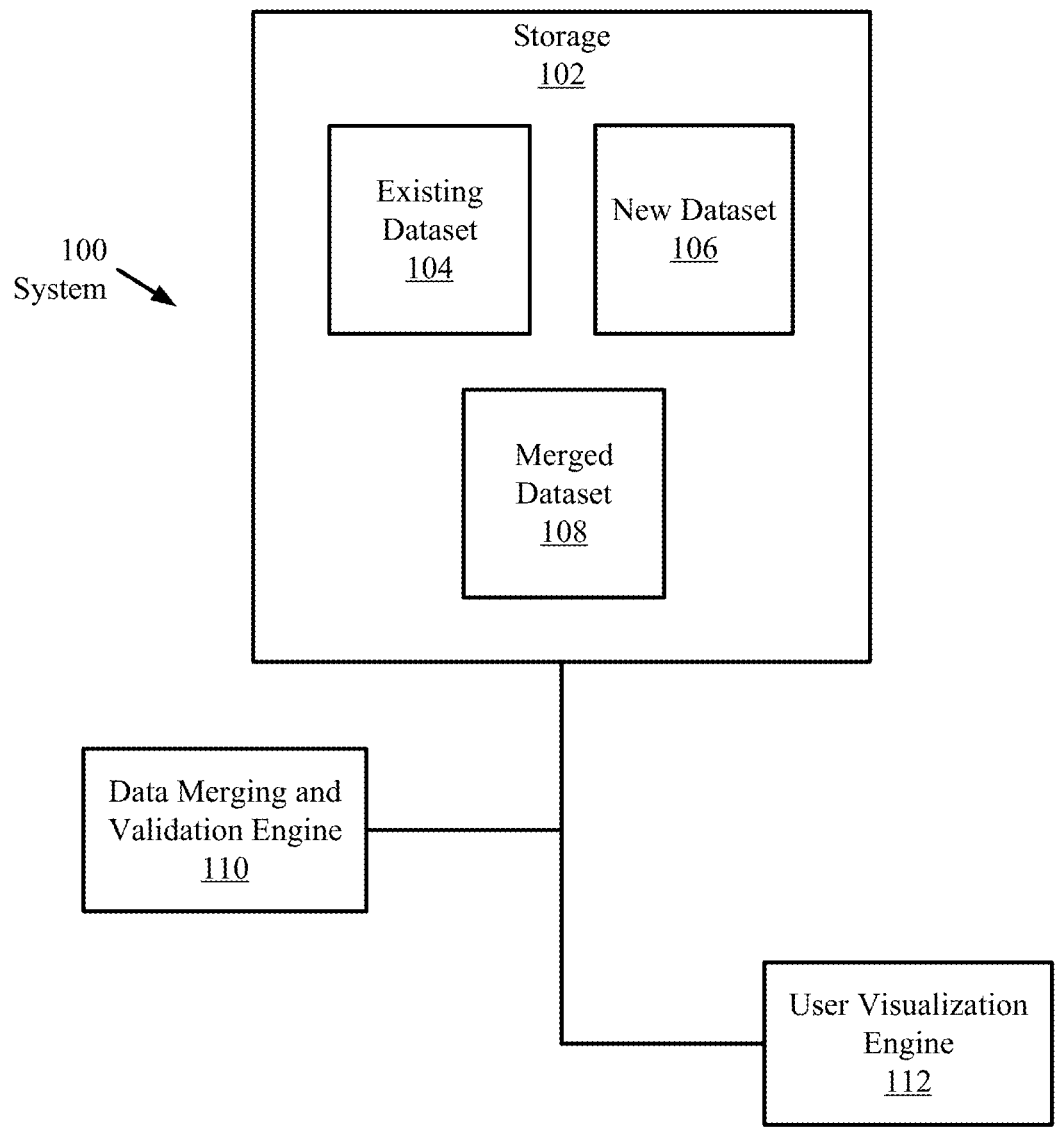
FIG. 1 shows a system in accordance with one or more embodiments.

Specific embodiments will now be described with reference to the accompanying figures.

In the below description, numerous details are set forth as examples of embodiments described herein. It will be understood by those skilled in the art, that have the benefit of this Detailed Description, that one or more embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components.

Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

One or more embodiments disclosed are directed to systems and methods for merging new datasets into existing datasets. In particular, in one or more embodiments disclosed herein, new datasets may include headers (e.g., data labels) associated with columns of items (e.g., specific data points), which a user may desire to merge into existing datasets. Various processes (discussed below in more detail in FIGS. 2-3.6) are executed on the new dataset and the existing dataset to merge the existing data and the new data. The aforementioned processes may also be executed to generate mappings between columns of the new dataset and columns of the existing dataset, matches (e.g., items included in the new data and the existing data), partial matches (e.g., items in the new data that are similar to items in the existing data), and new items (e.g., items included in the new data that are not included in the existing data, or not similar to any items included in the existing data). Such aforementioned processes may be different for different types of data included in the new data and the existing data. Moreover, a merge user interface (UI) may be generated that specifies the mappings, the matches, the partial matches, and the new items. Such a merge UI may be provided to a user (e.g., a data scientist, an IT administrator, a customer, etc.). The user may select, using the merge UI, user preferences associated with the mappings, the matches, the partial matches, and the new items. The new data may be merged into the existing data to generate merged data based on the user preferences, the mappings, the matches, the partial matches, and the new items.

As a result, embodiments disclosed herein may improve the efficiency of merging a large quantity of data with multiple data types from one source into a large quantity of data from another source. Traditional methods may include users manually adding the data from one source to a second source of data. Such traditional methods may be extremely time consuming, especially if large quantities of data are involved. Moreover, embodiments disclosed herein may improve the accuracy of data merging through validation and data type specific processing, for the aforementioned traditional methods may be prone to human error (e.g., typos, missing items of data during merging, incorrect mappings, incorrect matches, etc.). Furthermore, by obtaining user preferences using the merge UI, embodiments disclosed herein may increase user customization and provide user validation during data merging.

Various embodiments of the disclosure are described below.

FIG. 1 shows a system (100) in accordance with one or more embodiments. The system includes a storage (102), a data merging and validation engine (110), and a user visualization engine (112). In one or more embodiments disclosed herein, the system (100) may be part of a computing system (e.g., 400, FIG. 4). Each of these components of the system (100) will be described in more detail below.

As shown in FIG. 1, the system (100) includes the storage (102). The storage (102) may be implemented using volatile or non-volatile storage or any combination thereof. The storage (102) may be configured to store an existing dataset (104), a new dataset (106), and a merged dataset (108). In one or more embodiments, a dataset may be a data structure (e.g., a container and/or one or more lists, tables, collection of data values, etc.) storing information (e.g., data). The datasets may be any combination of, for example, files, databases, etc. The datasets may include columns of data and a header. The columns may include one or more data items (e.g., specific data points) associated with a particular category of data. The category may be specified by the header. The header may refer to one or more words, labels, and/or identifiers descriptive of, or otherwise associated with, the category of data included in the column. For example, a column comprising one or more dates of a sale may include data items specifying dates (e.g., days, months, and/or years) and be associated with the following header specifying that the column includes dates of sale: "Sale Closing Date". The datasets may include any quantity of columns, each with any quantity of data items without departing from embodiments disclosed herein.

In one or more embodiments, the datasets may include one or more types of data, referred to as data types. The data types may include, but not be limited to, a word data type, a non-word data type, a numeric data type, and a date data type. Each of the aforementioned data types is discussed below.

In one or more embodiments, a word data type may refer to any data items that include words, labels, identifiers, and/or any other combination of exclusively alphabetic characters readable by human users. Examples of a word data type may include "New York", "Product A", "Company A", "Category A", etc.

In one or more embodiments, a non-word data type may refer to any data items that include labels, identifiers, and/or any other combination of alphabetic and numeric characters. Examples of a non-word data type may include "Product1547", "A4BD789", "code_2323", "abc-123", etc.

In one or more embodiments, a numeric data type may refer to any data items that exclusively include combinations of numeric characters specifying numbers. Examples of numeric data types may include "123456", "541,765", "$154789", etc.

In one or more embodiments, a date data type may refer to any data items that specify points in time. Date data items may include months, days, year, hours, minutes, seconds, etc. Examples of date data types may include "Jan. 23, 2020", "Sep. 10, 1996", "25/12/2021 12:45:16 PM", "2022", "JUNE 2022", etc.

In one or more embodiments, other data types may be included without departing from the scope of embodiments disclosed herein. For example, the data types may further include a Boolean data type. In one or more embodiments, a Boolean data type may refer to any data items that specify whether a condition is true or false. Boolean data items may include true or false indicators and/or Boolean operators. Examples of true or false indicators may include, but not be limited to, "true", "false", "1", "0", "yes", "no", etc. Examples of Boolean operators may include, but not be limited to, "greater than", "less than", "greater than or equal to", "and", "or", "xor", "not", etc. Boolean operators may be specified by corresponding symbols (e.g., "<", ">", "&", "||", "=", "!", etc.) without departing from embodiments disclosed herein.

In one or more embodiments, an existing dataset (104) may be an embodiment of a dataset discussed above into which another dataset may be merged. The existing dataset (104) may include a previously merged dataset without departing from embodiments disclosed herein. In one or more embodiments, the new dataset (106) may be an embodiment of a dataset discussed above that may be merged into another dataset. In one or more embodiments, the merged dataset (108) may be an embodiment of a dataset discussed above that may include data of a new dataset (e.g., 106) that has been merged with the data of an existing dataset (e.g., 104).

While illustrated in FIG. 1 as stored in the storage (102), the existing dataset (104), the new dataset (106), and the merged dataset (108) may be stored across any quantity and type of external storages or external computing devices (not shown) operatively connected to the system (100) via a network (e.g., the Internet, a LAN, a WAN, etc.) without departing from embodiments disclosed herein. The new dataset (106) may be downloaded (e.g., via an application programming interface) or otherwise obtained from an external storage or an external computing device operatively connected to the system (100) prior to a merging operation without departing from embodiments disclosed herein.

In one or more embodiments, the storage (102) may also store metadata (not shown). The metadata may include descriptive data associated with the existing dataset (104), the new dataset (106), and/or the merged dataset (108). Examples of the metadata may include, but are not limited to: a dataset identifier (e.g., filename), a storage location associated with the dataset, similarity features, similarity matrices, mappings, matches, partial matches, new items, (all discussed below) etc. In one or more embodiments, the metadata may be stored as part of any of the datasets (e.g., 104, 106, 108). Alternatively, the metadata may be stored separately (i.e., independently) as its own entity within the storage (102).

In one or more embodiments disclosed herein, the system (100) further includes the data merging and validation engine (110). The data merging and validation engine (110) may be implemented in hardware (i.e., circuitry), software, or any combination thereof. In one or more embodiments, the data merging and validation engine (110) may be configured to merge a new dataset (e.g., 106) into an existing dataset (e.g., 104) to generate a merged dataset (e.g., 108) as shown in more detail below in FIGS. 3.1-3.4. Additional details of the processes executed by the data merging and validation engine (110) are discussed below in FIGS. 2.1-3.6.

In one or more embodiments disclosed herein, the system (100) further includes the user visualization engine (112). The user visualization engine (112) may be implemented in hardware (i.e., circuitry), software, or any combination thereof. In one or more embodiments, the user visualization engine (112) may be configured to cause a computing system (e.g., 400, FIG. 4) to generate and display a merge user interface (discussed below) during a data merge operation of one or more embodiments disclosed herein to a user. The user visualization engine may also be configured to obtain user indications that specify user preferences associated with the data merge operation through the merge user interface. Additional details regarding the processes executed by the user visualization engine (112) are discussed below in FIGS. 2.1-3.6.

Although the system (100) is shown as having three components (102, 110, 112), in other embodiments disclosed herein, the system (100) may have more or fewer components. For example, the functionality of each component described above may be split across components or combined into a single component (e.g., the functionalities of the data merging and validation engine (110) and the user visualization engine (112) may be combined to be implanted by a single component). Further still, each component (102, 110, 112) may be utilized multiple times to carry out an iterative operation.

FIGS. 2.1-2.3 show flowcharts in accordance with one or more embodiments. Turning now to FIG. 2.1, FIG. 2.1 shows a flowchart of a data merging method in accordance to one or more embodiments disclosed herein. The method depicted in FIG. 2 may be performed to merge data of a new dataset into data of an existing dataset. The method shown in FIG. 2.1 may be performed, for example, by a combination of the data merging and validation engine (e.g., 110, FIG. 1) and the user visualization engine (e.g., 112, FIG. 1). Other components of the system in FIG. 1 may perform all, or a portion, of the method of FIG. 2.1 without departing from the scope of the embodiments described herein.

While FIG. 2.1 is illustrated as a series of steps, any of the steps may be omitted, performed in a different order, additional steps may be included, and/or any or all of the steps may be performed in a parallel and/or partially overlapping manner without departing from the scope of the embodiments described herein.

Initially, in Step 200, a new dataset (e.g., 106, FIG. 1) and an existing dataset (e.g., 104, FIG. 1) associated with a data merge event are obtained. The data merge event may include, for example, obtaining a request to merge the new dataset into the existing dataset from a user. The request may specify the existing dataset and the new dataset to use in the data merging operation. In one or more embodiments, the existing dataset and the new dataset may be obtained from any source (e.g., the storage (102) of FIG. 1, an external source such as a server, etc.) and may be of any size without departing from embodiments disclosed herein.

In Step 202, the new dataset and the existing data set are grouped based on data types. As discussed above, the new dataset and the existing dataset may include columns with data items associated with one or data types (e.g., word data, non-word data, numeric data, date data, and Boolean data). In one or more embodiments, the new dataset and the existing dataset may be parsed to identify the data type associated with each column of data items. Each column of the new dataset and the existing dataset may be classified based on the associated data type of the data items included in the column. Each column of the new dataset and the existing dataset may then be grouped according to data type classified to each column. The new dataset and the existing data set may be grouped based on data types using any appropriate method(s) of grouping without departing from embodiments disclosed herein.

As an example, a new dataset may include four columns: a first column may include data items with alphabetic characters, a second column may include data items with numeric characters, a third column may include data items with alphanumeric characters, and a fourth column with data items associated with a format specifying a point in time. The first column may be classified as a word data type column, the second column may be classified as a numeric column, the third column may be classified as a non-word data type column, and the fourth column may be classified as a date data type column. Accordingly, the first column may be grouped with other word data type columns, the second column may be grouped with other numeric data type columns, the third column may be grouped with other non-word data type columns, and the fourth column may be grouped with other date data type columns. In one or more embodiments, any quantity of columns associated with a particular data type may be grouped in each data type group without departing from embodiments disclosed herein.

In Step 204, data type specific processing is performed on the existing dataset and the new dataset to generate similarity features. In one or more embodiments, data type specific processing may be performed on each group of data type specific columns included in the existing dataset and the new dataset. Accordingly, data type specific similarity features may be generated for each group of data type specific columns included in the existing dataset and the new dataset. For additional information regarding performing data type specific processing on the existing dataset and the new dataset, refer to FIG. 2.2.

In Step 206, a similarity matrix associated with the existing dataset and the new dataset is generated using the similarity features. In one or more embodiments, the similarity features associated with each column and column header in the new dataset and the existing dataset may be used to generate a similarity score between each column of the new dataset and each column of the existing dataset. The similarity score between a column of the new dataset and a column of the existing dataset may indicate how similar the heading and the average data item included in the new dataset column are to those of the existing dataset column. A low similarity score between two columns may specify a high similarity between the columns. Accordingly, a high similarity score between two columns may specify a low similarity (i.e., a high dissimilarity) between the two columns. The similarity score may be generated using any appropriate method(s) of generating a similarity between two columns (e.g., cosine similarity, Euclidean distance, Jaccard similarity, etc.) without departing from embodiments disclosed herein.

In one or more embodiments, a similarity matrix may be generated for each data type included in the new dataset and the existing dataset. For example, one similarity matrix may be generated for comparing the similarity scores between columns of the new data set and the existing dataset that are in the word data type group, one similarity matrix may be generated for comparing the similarity scores between columns of the new data set and the existing dataset that are in the non-word data type group, and so on. As a result, each similarity matrix may only compare columns that include the same data type. In one or more embodiments, a similarity matrix may be generated using the similarity scores between the columns of the new dataset and the columns of the existing dataset. The similarity matrix may specify the similarity score between each column in the new dataset with each column in the existing dataset.

In Step 208, a comparison between the existing dataset and the new dataset is performed using optimization and the similarity matrix to identify mappings. In one or more embodiments, optimization may include global optimization. Other and/or additional methods of optimization (e.g., sub-optimal optimization, heuristics, etc.) may be used without departing from embodiments disclosed herein. In one or more embodiments, global optimization (e.g., the Munkres assignment algorithm) may include selecting mappings between the columns of the new dataset and the columns of the existing dataset to achieve the lowest possible combined similarity score for the total selection of mappings between all of the columns of the new dataset and the existing dataset. In one or more embodiments, the mappings selected between two columns may be exclusive. Said another way, if a similarity score between two columns is selected, then the two columns may not be used for selecting a similarity score for other columns. As a result, the global similarity between the new dataset and the existing dataset may be used for identifying mappings between columns of the new dataset and columns of the existing dataset.

The selected mappings that result in the lowest total similarity score between the columns of the new dataset and the columns of the existing dataset may be identified as the mappings. In one or more embodiments, the mappings may specify columns of the new dataset that are to be merged with corresponding columns of the existing dataset. The mapping may be generated based on similarity comparisons of one or more similarity matrices and optimization. The comparisons between the existing dataset and the new dataset using the similarity matrix and optimization may be performed using other and/or additional methods without departing from embodiments disclosed herein. For additional discussion regarding performing comparisons between the existing dataset and the new dataset using the similarity matrix and optimization, refer to the example of FIG. 3.3.

For embodiments in which multiple similarity matrices are generated for each data type group, Step 208 may be performed for each similarity matrix.

In Step 210, data type specific validation is performed on the existing dataset and the new dataset to identify matches, partial matches, and new items. In one or more embodiments, data type specific validation may be performed on each group of data type specific columns included in the existing dataset and the new dataset. Accordingly, matches, partial matches (e.g., for word data types and non-word data types), and new items may be generated for each group of data type specific data columns included in the existing dataset and the new dataset that are being merged. Furthermore, potential issues and common formatting associated with the data types may also be identified. For additional information regarding performing data type specific validation on the existing dataset and the new dataset, refer to FIG. 2.3.

In Step 212, a merge user interface (UI) is generated using the mappings, matches, partial matches, and new items. In one or more embodiments, the merge UI may allow a user to visualize the information associated with the merge operation prior to executing the merge operation. The merge UI may be interface that allows users to interface with a device through, for example, graphical icons and/or other types of sensory stimuli (e.g., sounds). For example, a merge UI may be a data structure that defines the information, arrangement, color, and/or other characteristics of portions of a display. The merge UI may also be interactive in that it enables users to provide input (e.g., input information via mouse clicks) with respect to different portions of the display.

The merge UI may include user interaction capabilities without departing from embodiments disclosed herein. For example, a user of the system may use an input device such as a mouse, keyboard, touch screen, etc., to interact with the elements of the merge UI. User interactions may include scrolling, selecting buttons or icons, and/or other user interactions without departing from embodiments disclosed herein. The merge UI may enable users to alter a data merging operation to merge the new dataset into the existing dataset to meet user preference requirements.

In one or more embodiments, the merge UI may include one or more display pages that include regions associated with mappings, matches, partial matches, and new items. A first page of the merge UI may include a representation of a default merge operation without user preferences. The first page may display a merged dataset of the new dataset and the existing dataset based on the mappings, the matches, the partial matches, and the new items. The merged dataset may include the headers and columns of the existing dataset, with each column including data items of the existing dataset and/or merged data items of the new dataset. The first page may indicate, via color or textual representations, the data items of the new dataset that were merged to the existing data. The first page may include other and/or additional information regarding the default merging without departing from embodiments disclosed herein.

In one or more embodiments, the merge UI may include a second display page that includes regions associated with particular column mappings. For example, the first page may include a set of rows and columns. Each row may be associated with a particular column mapping between the new dataset and the existing dataset. Each column may specify a merging metadata property (e.g., new dataset column, existing dataset column, new item, match, and partial match) associated with the column mapping. The first column may specify the new dataset column (e.g., the header of the new dataset column). The second column may specify the existing dataset column which the new dataset column is mapped to (e.g., the header of the existing dataset column). The third column may specify the number of data item matches between the corresponding new dataset column and the existing dataset column. The fourth column may specify the number of new items between the corresponding new dataset column and the existing dataset column. The fifth column may specify the number of partial matches between the corresponding new dataset column and the existing dataset column. The second display page may include other and/or additional information without departing from embodiments disclosed herein.

Each row corresponding to a mapped new dataset column and an existing dataset column may be selected by a user, which may open an additional page on the merge UI. The additional page may include more details associated with the merging metadata properties corresponding to the mapping. The additional page may specify the data items in the new dataset column and the existing column which are associated with each match and partial match. The additional page may also specify each new item included in the new dataset column that is not included in the existing dataset column. The additional page may also provide user indication options (e.g., check boxes, drop down menu selections, etc.) that a user may use to submit user preferences associated with the partial matches and the new items. The user indication options may include, for example, "Accept partial match", "Accept new item", "Ignore new item", "Ignore partial match", "Manually map partial match", "Remove outliers from merging operation", etc. Such aforementioned user indication options may specify user preferences associated with partial matches and new items that may be taken into account when the merging operation is performed. For example, a new data item that is associated with a user preference to "Ignore new item" will not be included in the generated merged dataset.

While discussed above as including specific information, display configurations, and interaction capabilities, the merge UI may include other and/or additional information, display configurations, and/or interaction capabilities without departing from embodiments disclosed herein. As discussed above, ordinal numbers (e.g., first, second, third, etc.) may be used as an adjective for an element (i.e., pages of the merge UI) to distinguish between multiple display pages. The use of ordinal numbers is not to imply or create any particular ordering of the pages nor to limit any page to being only a single page unless expressly disclosed. As a result, the first display page, the second display page, and/or the additional display page discussed above may refer to any page of the merge UI without departing from embodiments disclosed herein.

In Step 214, the merge UI is provided to a user. In one or more embodiments, the merge UI may be displayed to a user via any appropriate method for displaying a user interface without departing from embodiments disclosed herein.

In Step 216, user preferences associated with the merge UI are obtained. As discussed above, the merge UI may include user interaction capabilities and user indication options. The user may adjust the user indication options through user interactions to indicate user preference associated with the new items and partial matches associated with the mappings of the data merge operation. The user may submit a notification or perform some user interaction to indicate that the user indication options are set and to perform the merge operation (e.g., by clicking a button on the merge UI, pressing a key on the keyboard, etc.). As a result, the user indication operation may be read from the merge UI to obtain the user preferences.

In Step 218, a merged dataset is generated using the user preferences, the mappings, the existing dataset, and the new dataset. In one or more embodiments, the new dataset may be merged into the existing dataset based on the mappings. For example, the data items of a new dataset column may be merged with the data items of the corresponding existing dataset column. Partial matches and new matches may be merged based on user preferences. For example, based on the user preferences, partial matches may be accepted, merged based on user manual mapping, ignored during merging, etc. As an additional example, based on the user preferences, new items may be accepted, merged, ignored, etc.

Turning now to FIG. 2.2, FIG. 2.2 shows a flowchart of a data type specific processing method in accordance to one or more embodiments disclosed herein. The method depicted in FIG. 2.2 may be performed to process data of different data types in a new dataset and an existing dataset. The method shown in FIG. 2.2 may be performed, for example, by the data merging and validation engine (e.g., 110, FIG. 1). Other components of the system in FIG. 1 may perform all, or a portion, of the method of FIG. 2.2 without departing from the scope of the embodiments described herein.

While FIG. 2.2 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 220, word data type processing is performed on the existing dataset and the new dataset to generate word similarity features. As discussed above with regard to Step 202 of FIG. 2.1, the existing dataset and the new dataset are grouped based on data type. In one or more embodiments, for each column included in the new dataset and the existing dataset that is associated with the word data type, word data type processing may be performed to generate word similarity features. Furthermore, word data type processing may be performed for the headers of each of the columns of the existing dataset and the new dataset.

In one or more embodiments, the word data type processing may include cleaning and tokenization to prepare for applying a natural language processing model to the word data items. In one or more embodiments, cleaning may include, but not be limited to, removing unnecessary punctuation, transforming all words into lowercase words, etc. In one or more embodiments, tokenization may include separating multiple words included in data items into smaller units called tokens (e.g., words, sets of characters, subwords, etc.). Other and/or additional methods of cleaning and/or tokenization the word data items of the existing dataset and the new dataset may be performed without departing from embodiments disclosed herein.

In one or more embodiments, the word data type processing may further include generating applying a natural language processing model to the data items of each column to convert the words into vectors. Any appropriate natural language processing model (e.g., Word2vec, GloVe, etc.) that converts words into vectors may be used to convert the data items into vectors without departing from embodiments disclosed herein. For each column included in the word data type group of the new dataset and the existing dataset, the centroid vector may be generated using the vectors associated with each data item included in the column. As a result, the centroid vector may represent the average entirety of the word data items included in the column. The centroid vector may be referred to as a word similarity feature, and may be used to generate the similarity matrix as discussed in Step 206 of FIG. 2.1.

In addition to generating the centroid vector for each column associated with the word data type group of the new dataset and the existing dataset, the vector for the header of each column may also be generated. The vector for each header may be generated using the methods discussed above with regard to generating vectors for word data items without departing from embodiments disclosed herein. The header vectors may also be included as a word similarity feature associated with each column of the new dataset and the existing dataset, which may also be used to generate the similarity matrix as discussed above.

Other and/or additional methods of word data type specific processing may be performed to generate other and/or additional word similarity features without departing from embodiments disclosed herein.

In Step 222, non-word data type processing is performed on the existing dataset and the new dataset to generate non-word similarity features. As discussed above with regard to Step 202 of FIG. 2.1, the existing dataset and the new dataset are grouped based on data type. In one or more embodiments, for each column included in the new dataset and the existing dataset that is associated with the non-word data type, non-word data type processing may be performed to generate non-word similarity features.

In one or more embodiments, the non-word data type processing may include performing pattern analysis of the non-word data items included in each column. The pattern analysis may include: (i) identifying character lengths associated with the non-word data items included in each column (e.g., for non-words of same lengths such as alphanumeric codes), (ii) identifying a same first letter or digit or sequence of letters or digits of the non-word data items (e.g., particular product codes may be associated with a particular starting letter or number, URLs, etc.), and (iii) calculating the average Levenshtein distance between the non-word data items included in each column. The character lengths, first letter or digit, and average Levenshtein distance may be referred to as non-word similarity features, which may be compared between the same features of other columns to generate similarity scores and the similarity matrix.

In addition to generating the aforementioned non-word similarity features associated with the non-word data type group of the new dataset and the existing dataset, the vector for the header of each column in the group may also be generated. The vector for each header may be generated using the methods discussed above in Step 220 with regard to generating vectors for non-word data items without departing from embodiments disclosed herein. The header vectors may also be included as a non-word similarity feature associated with each column of the new dataset and the existing dataset included in the group of non-word data types, and may also be used to generate the similarity matrix as discussed above.

Other and/or additional methods of non-word data type specific processing may be performed to generate other and/or additional non-word similarity features without departing from embodiments disclosed herein.

In Step 224, numeric data type processing is performed on the existing dataset and the new dataset to generate numeric similarity features. As discussed above with regard to Step 202 of FIG. 2.1, the existing dataset and the new dataset are grouped based on data type. In one or more embodiments, for each column included in the new dataset and the existing dataset that is associated with a numeric data type, numeric data type processing may be performed to generate numeric similarity features.

In one or more embodiments, the numeric data type processing may include performing pattern analysis of the numeric data items included in each column. The pattern analysis may include: (i) identifying the average numeric length (e.g., the number of digits included in a numeric data item) associated with the numeric data items included in each column, (ii) identifying intervals and/or the average interval (e.g., the difference and/or the average distance between two consecutive numeric data items), and (iii) calculating the average intersection ratio between the numeric data items included in each column. The average numeric length, the intervals and/or average interval, and the average intersection ratio may be referred to as numeric similarity features, which may be compared between the same features of other columns to generate similarity scores and the similarity matrix.

In addition to generating the aforementioned numeric similarity features associated with the numeric data type group of the new dataset and the existing dataset, the vector for the header of each column in the group may also be generated. The vector for each header may be generated using the methods discussed above in Step 220 with regard to generating vectors for numeric data items without departing from embodiments disclosed herein. The header vectors may also be included as a numeric similarity feature associated with each column of the new dataset and the existing dataset included in the group of numeric data types, and may also be used to generate the similarity matrix as discussed above.

Other and/or additional methods of numeric data type specific processing may be performed to generate other and/or additional numeric similarity features without departing from embodiments disclosed herein.

In Step 226, date data type processing is performed on the existing dataset and the new dataset to generate date similarity features. As discussed above with regard to Step 202 of FIG. 2.1, the existing dataset and the new dataset are grouped based on data type. In one or more embodiments, for each column included in the new dataset and the existing dataset that is associated with a date data type, date data type processing may be performed to generate date similarity features.

In one or more embodiments, the date data type processing may include first analyzing the new dataset to determine whether the new dataset includes a date column. In one or more embodiments, date data items may or may not be included in one or more columns, rows, and/or one or more headers (e.g., time series data structure with columns of other data types associated with a particular point or period of time) of the new dataset. In one or more embodiments, if no date column is included in the new dataset (i.e., the columns and/or headers do not include date data items), then it may be determined that no date may be analyzed using date data type processing. As a result, Step 226 may be skipped.

In one or more embodiments, if it is determined that a date column and/or a row (e.g., headers) is included in the new dataset, then date data processing is performed on the date columns and/or rows of the existing dataset and the new dataset to generate date similarity features. In one or more embodiments, date similarity features may be generated for each date column and/or row of the existing dataset and the new dataset. In one or more embodiments, the date similarity features may include date granularity and date ranges. Other and/or additional types of date similarity features may be generated without departing from embodiments disclosed herein. In one or more embodiments, the date range may refer to the difference between the most recent date and the oldest date included in the date column or date header. In one or more embodiments, date granularity may refer to the quantity of time specified by the date data items included in the date column. For example, a date column that includes date data items that only denote years (e.g., 2020, 2021, 2015, etc.) may be associated with a low granularity. Accordingly, a date column includes date data items that denote seconds, minutes, hours, days, months, and years may be associated with a high granularity.

The date similarity features of the new dataset and the existing dataset may be used to generate a similarity matrix and a similarity score to compare each date data type columns and/or rows of the new dataset to each of the date data type columns and/or rows of existing dataset. The comparisons may be used to map a date data type column of the new dataset to a similar (e.g., as denoted by the similarity matrix and the similarity scores) date data type column of the existing dataset.

Other and/or additional methods of date data type specific processing may be performed to generate other and/or additional date similarity features without departing from embodiments disclosed herein.

In Step 228, Boolean data type processing is performed on the existing dataset and the new dataset to generate Boolean similarity features. As discussed above with regard to Step 202 of FIG. 2.1, the existing dataset and the new dataset are grouped based on data type. In one or more embodiments, for each column included in the new dataset and the existing dataset that is associated with a Boolean data type, Boolean data type processing may be performed to generate Boolean similarity features.

In one or more embodiments, the Boolean data type processing may include identifying a Boolean format associated with each column. As discussed above, the Boolean data items may be associated with or otherwise include multiple different formats such as Boolean symbols (e.g., "<", "&", "!", etc.), Boolean words (e.g., "true", "false", "greater than", "not", etc.), and/or Boolean numbers (e.g., "0", "1"). Other types of Boolean formats may be included in the columns of the new dataset and/or the existing dataset without departing from embodiments disclosed herein. In one or more embodiments, if the header of a Boolean data type column includes one or more words descriptive of the Boolean data type column, a header vector associated with the Boolean data type column may be generated as an additional similarity feature as discussed above.

Other and/or additional Boolean data type processing may be performed to generate other and/or additional Boolean similarity features without departing from embodiments disclosed herein. The Boolean similarity features may be used to generate a similarity matrix between the new dataset and the existing dataset to identify Boolean data type columns of the existing dataset that match Boolean data type columns of the new dataset.

Boolean data type processing may be performed on the existing dataset and the new dataset to generate Boolean similarity features via other and/or additional methods without departing from embodiments disclosed herein.

In one or more embodiments, other data types besides the ones described above may be included in the new dataset and the existing dataset. Therefore, other data type specific processing methods may be performed for the other data types without departing from embodiments disclosed herein.

In one or more embodiments, if a data type is not included in the new dataset, then the data type specific processing step associated with the missing data type may be skipped without departing from embodiments disclosed herein. In one or more embodiments, if a data type is included in the new dataset and is not included the existing dataset, then the data type specific processing step associated with the data type may be skipped as the data columns of the new dataset associated with the data type may be included as new columns when merged into the existing dataset.

In one or more embodiments, the method may end following Step 228.

Turning now to FIG. 2.3, FIG. 2.3 shows a flowchart of a data type specific validation method in accordance to one or more embodiments disclosed herein. The method depicted in FIG. 2.3 may be performed to validate data of different data types in a new dataset and an existing dataset. The method shown in FIG. 2.3 may be performed, for example, by the data merging and validation engine (e.g., 110, FIG. 1). Other components of the system in FIG. 1 may perform all, or a portion, of the method of FIG. 2.3 without departing from the scope of the embodiments described herein.

While FIG. 2.3 is illustrated as a series of steps, any of the steps may be omitted, performed in a different order, additional steps may be included, and/or any or all of the steps may be performed in a parallel and/or partially overlapping manner without departing from the scope of the embodiments described herein.

In Step 230, word data type validation is performed on the existing dataset and the new dataset. As discussed above, mappings between word data type columns of the new dataset and word data type columns of the existing dataset may be generated. In one or more embodiments, the mappings may be validated by performing word data type validation to identify matches, partial matches, new items and any potential word data type issues.

In one or more embodiments, the word data type validation may include applying the natural language processing model (e.g., Word2vec, GloVe, etc.) to the data items of each column of the new dataset and the existing dataset to generate vectors associated with the word data items. The vectors associated with each word data item included a new column may be compared (e.g., using cosine similarity) with each vector associated with the word data items included in the mapped existing dataset to identify matches (e.g., new dataset column vector matches a mapped existing column dataset vector), partial matches (e.g., the similarity between a new dataset column vector and a mapped existing column dataset vector is above a similarity threshold) and new items (e.g., the similarities between a new dataset column vector and all vectors of a mapped existing dataset column are below a similarity threshold). Additionally, a phonetic algorithm (e.g., Metaphone) may be applied to each of the data items of the new words to detect partial matches between word data items in the new dataset and the word data items in the existing dataset that sound similar (e.g., to detect typos or misspellings). Other and/or additional methods of word data type specific validation may be performed to identify matches, partial matches, and new items between mapped new dataset columns and existing dataset columns associated with the word data type without departing from embodiments disclosed herein.

In Step 232, non-word data type validation is performed on the existing dataset and the new dataset. As discussed above, mappings between non-word data type columns of the new dataset and non-word data type columns of the existing dataset may be generated. In one or more embodiments, the mappings may be validated by performing non-word data type validation to identify matches, partial matches, new items, and any potential non-word data type issues.

In one or more embodiments, the non-word data type validation may include applying Levenshtein distance model to the non-word data items of each column of the new dataset and the mapped column of the existing dataset. In one or more embodiments, non-word data items between the two columns that are the same may be identified as matches. For each non-word data item of a new dataset column that is not a match with a corresponding word in the mapped existing dataset column, the Levenshtein distance may be generated for all other non-word data items in the mapped column of the existing dataset. As a result, the Levenshtein distance model may be used to identify partial matches (e.g., the Levenshtein distance between a non-word data item of the new dataset and a non-word data item of a mapped existing dataset column is below a configurable threshold), and new items (e.g., the Levenshtein distance between a non-word data item of the new dataset and a non-word data item of a mapped existing dataset column is above a configurable threshold). The Levenshtein distance model may also be used to identify potential non-word data item issues (e.g., pattern inconsistency between the non-word data items, non-word data item outliers, etc.) and may flag such issues to notify a user (e.g., through the merge UI discussed below). Other and/or additional methods of non-word data type specific validation may be performed to identify matches, partial matches, and new items between mapped new dataset columns and existing dataset columns associated with the word data type without departing from embodiments disclosed herein.

In Step 234, numeric data type validation is performed on the existing dataset and the new dataset. As discussed above, mappings between numeric data type columns of the new dataset and numeric data type columns of the existing dataset may be generated. In one or more embodiments, the mappings may be validated by performing numeric data type validation to identify matches, partial matches, and new items between the non-word data items of the columns of the new dataset and the columns of the existing dataset.

In one or more embodiments, the numeric data type validation may include directly comparing numeric data items to identify new data items and matches. For numeric data items, matches may be considered new items as they may not be mapped to other matching or partial matching numeric data items in the same fashion that word data items and non-word data types may be mapped to other matching or partial matching word data items and non-word data items. Partial matches may not be identified for numeric data items. Additionally, the Z-score may be calculated for each numeric data item based on all other numeric data items included in the new dataset column and the mapped existing dataset column to identify potential numeric data item issues (e.g., numeric data item outliers). Such potential numeric data item issues may be the result of typos or incorrectly entered data. Furthermore, a common numeric data item format (e.g., the data item format associated with the most numeric data items in a new dataset column and a mapped existing dataset column) may be identified to avoid inconsistent formatting issues. Examples of numeric data item formats may include number of decimal places, symbols (e.g., commas, dollar signs, etc.) and/or other numeric data item formats without departing from embodiments disclosed herein. The common numeric data item format may be used when the merge is performed. In other words, numeric data items that do not include the common numeric data item format may be changed to include the numeric data item format during merging. Other and/or additional methods of numeric data type specific validation may be performed to identify matches, new items, and numeric data type potential issues without departing from embodiments disclosed herein.

In Step 236, date data type validation is performed on the existing dataset and the new dataset. As discussed above, mappings between date data type columns of the new dataset and date data type columns of the existing dataset may be generated. In one or more embodiments, the mappings may be validated by identifying and addressing potential date format inconsistency issues between the new dataset columns and the mapped existing dataset columns.

In one or more embodiments, the date data type validation may include performing date format analysis on the date items included in a new dataset column and a mapped existing dataset column. In one or more embodiments, the granularity of the date data items in the new dataset columns may be compared to the granularity of the date data items included in the mapped existing dataset column. If the granularity of the date data items in the new dataset column is lower than the granularity of the date data items in the existing dataset column (e.g., the date data items of the new dataset column include less date information than the date data items of the existing dataset column), then a date granularity issue may be identified as the granularity of the new dataset column cannot be changed to match the granularity of the existing dataset column. For example, date data items that only denote a year cannot be changed to a date data items that denote a day, month, and year. If the granularity of the date data items in the new dataset column is higher than the granularity of the date data items in the existing dataset column (e.g., the date data items of the new dataset column include more date information than the date data items of the existing dataset column), then the date granularity of the new dataset column may be changed to match the granularity of the existing dataset column.

In one or more embodiments, the date item formats between a new dataset column and a mapped existing dataset column may be compared to determine whether the date data item formats of the new dataset column and the mapped existing dataset column are different. In one or more embodiments, if the date data item formats are different, then a date data item format may be identified and a common date data item format may be generated. In one or more embodiments, the common date item format may be generated by adopting the most frequently used date format and/or the most consistent date data item format using the date intervals associated with each column corresponding to each date data item format. In one or more embodiments, if the date data item format is specified for both the new dataset column and the mapped existing dataset column, then the most frequent (e.g., the date data item format used for the most date data items between the two columns) may be identified as the common date data item format. For date data item formats that are not specified, multiple formats may be adopted for each column to identify the date data item format associated with the column using date formatting errors (e.g., months with values above 12, days of a month with values above the maximum number of days associated with the month, etc.) and interval consistency calculations. An interval may specify the date ranges between each consecutive date data items in a column. The date data item format associated with the least date formatting errors and the highest interval consistency (e.g., least variance between consecutive date data items) may be identified as the date data item format for the columns. Whichever format is the most frequent may then be identified as the common date data item format which may be used during the merging operation.

Other and/or additional methods of date data type specific validation may be performed to identify and address other and/or additional potential date format inconsistency issues between the new dataset columns and the mapped existing dataset columns without departing from embodiments disclosed herein.

In Step 238, Boolean data type validation is performed on the existing dataset and the new dataset. As discussed above, mappings between Boolean data type columns of the new dataset and Boolean data type columns of the existing dataset may be generated. In one or more embodiments, the mappings may be validated by identifying and addressing potential Boolean format inconsistency issues between the new dataset columns and the mapped existing dataset columns.

In one or more embodiments, the Boolean data item formats between a new dataset column and a mapped existing dataset column may be compared to determine whether the Boolean data item formats of the new dataset column and the mapped existing dataset column are different. In one or more embodiments, if the date data item formats are different, then a common Boolean data item format may be generated. In one or more embodiments, the common date item format may be generated by adopting the most frequently used Boolean data type format and/or the Boolean data item format of the existing dataset column (e.g., based on user preference). In one or more embodiments, if the user preference specifies that the most frequent Boolean data item format is to be used, then the most frequent (e.g., the Boolean data item format used for the most Boolean data items between the two columns) may be identified as the common date data item format. In one or more embodiments, if the user preference specifies that the Boolean data item format of the existing dataset column is to be used, then the Boolean data item format of the new dataset column may be changed to the Boolean data item formatting of the existing dataset column.

Other and/or additional methods of Boolean data type specific validation may be performed to identify and address other and/or additional potential Boolean format inconsistency issues between the new dataset columns and the mapped existing dataset columns without departing from embodiments disclosed herein.

In one or more embodiments, other data types besides the ones described above may be included in the new dataset and the existing dataset. Therefore, other data type specific validation methods may be performed for the other data types without departing from embodiments disclosed herein.

In Step 240, the existing dataset and the new dataset are updated based on the word data type validation, the non-word data type validation, the numeric data type validation, the date data type validation, and the Boolean data type validation. In one or more embodiments, the existing dataset and the new dataset may be updated to incorporate consistent formatting (e.g., common date data item formatting, common Boolean data item formatting, data date item granularity, numeric data item formatting, etc.) identified during the data type specific validations. Additionally, partial data matches between word data items, numeric data items, and/or non-word data items included in the new dataset may be updated to the mapped word data item of the associated mapped existing dataset column. Other and/or additional updates may be made to the existing dataset and/or the new dataset based on the data type specific validations without departing from embodiments disclosed herein.

In one or more embodiments, the method may end following Step 240.

In one or more embodiments, the methods discussed above in FIGS. 2.1-2.3 may be repeated, or otherwise used, to generate a merged dataset using more than two datasets. As an example, there may be three new data datasets that may be sequentially, or in parallel, merged into an existing dataset using the methods discussed above in FIGS. 2.1-2.3. Any quantity of datasets (e.g., new datasets and/or existing datasets) may be merged to generate a merged dataset without departing from embodiments disclosed herein.

FIGS. 3.1-3.6 show examples in accordance with one or more embodiments. In particular, FIGS. 3.1-3.4 show example visual representations of how the new datasets are merged into existing datasets to generate merged datasets. FIGS. 3.5-3.6 show an example visual representation of a merge user interface. FIGS. 3.1-3.6 are intended to illustrate simple examples associated with embodiments disclosed herein for explanatory purposes. No parts of the visual representations shown in the examples of FIGS. 3.1-3.6 should be used to limit how data associated with one or more embodiments disclosed herein is visually represented (e.g., visually displayed to a user).

Beginning of Examples

Consider a scenario in which a user of a system that includes a storage (e.g., 102, FIG. 1) (not shown), a data merging and validation engine (e.g., 110, FIG. 1) (not shown), and a user visualization engine (e.g., 112, FIG. 1) (not shown) merges a new dataset into an existing dataset to generate a merged dataset. FIG. 3.1 shows an example visual representation of an existing dataset (300) stored in the storage. The existing dataset (300) includes five columns of data. The five columns include the following headers, respectively: "Company Name", "State", "Country", "Close Date", and "Booking Amount". The first column includes five data items specifying company names: "Company A", "Company B", "Company C", "Company D", and "Company E". The second column includes three data items specifying states: "Texas", "Florida", and "New York". The third column includes five data items specifying a country: "United States", "United States", "United States", "Germany", and "Italy". The fourth column includes five data items specifying a close date: "Feb. 5, 2021", "Mar. 6, 2021", "Nov. 21, 2020", "Aug. 10, 2019", and "Sep. 10, 2021". The fifth and last column includes five data items specifying a booking amount: "$201,006.89", "$513,521.00", "$752,698.54", "$123457.63", and "$458,123.45".

At a first point in time, the user stores a new dataset in the storage. FIG. 3.2 shows an example visual representation of a new dataset (302) now stored in the storage. The new dataset (302) includes five columns of data. The five columns include the following headers, respectively: "Customer", "State", "Country", "Date", and "Sale Value". The first column includes four data items specifying customers: "Company A", "Company G", "Company H", and "Company I". The second column includes three data items specifying states: "TX", "CA", and "NJ". The third column includes four data items specifying a country: "US", "US", "US", and "Itily". The fourth column includes four data items specifying a date: "20/02/2021", "26/03/2021", "21/11/2020", and "22/12/2021". The fifth and last column includes four data items specifying a sale value: "301,006.8900", "613,521.0000", "852,698.5400", and "652,697.5400".

After uploading the new dataset (302), the user submits a request to merge the new dataset (302) into the existing dataset (300) to the data merging and validation engine. In response to obtaining the request, the data merging and validation engine reads the existing dataset (300) and the new dataset (302) from the storage. The data merging and validation engine then groups the new dataset (302) and the existing dataset (302) based on data types. As shown in FIG. 3.1, the existing dataset includes three data types. Columns one, two, and three include data items with word data types, column four includes data items with date data types, and column five includes data items with numeric data types. Similarly, as shown in FIG. 3.2, the new dataset (302) also includes three data types. Columns one, two and three include data items with word data types, column four includes data items with date data types, and column five includes data items with numeric data types.

Accordingly, columns one, two, and three of the existing dataset (300) and the new dataset (302) are included in a word data type group, column four of the existing dataset (300) and the new dataset (302) are included in a date data type group, and column five of the existing dataset (300) and the new dataset (302) are included in a numeric data type group. Data type specific processing is then performed to generate similarity features for the groups of data types included in the existing dataset (300) and the new dataset (302). Word data type specific processing is performed on the first, second, and third columns of the existing dataset (300) and the new dataset (302) of the word data type group to generate word similarity features associated with each column of the word data type group. Date data type specific processing is performed on the fourth columns of the existing dataset (300) and the new dataset (302) of the date data type group to generate date similarity features associated with each column of the date data type group. Numeric data type specific processing is performed on the fifth columns of the existing dataset (300) and the new dataset (302) of the numeric data type group to generate numeric similarity features associated with each column of the numeric data type group.

After generating the similarity features for each column, similarity scores between the columns of the existing dataset (300) and the columns of the new dataset (302). The similarity scores are then used to generate a similarity matrix. A comparison between the columns of the existing dataset (300) and the new dataset (302) using the similarity matrix and optimization is performed to identify mappings between the columns of the new dataset (302) and the columns of the existing dataset (300). The optimization method included in this example is global optimization.

FIG. 3.3 shows a diagram of an example similarity matrix (304). The example similarity matrix (304) includes two columns corresponding with the two columns of an example existing dataset labeled "1" and "2". The example similarity matrix (304) includes two rows corresponding with the two columns of an example new dataset labeled "1*" and "2*". The example similarity matrix (304) indicates that the similarity score between column "1" of the example existing dataset and column "1*" of the example new dataset is "1". The example similarity matrix (304) indicates that the similarity score between column "1" of the example existing dataset and column "2*" of the example new dataset is "2". The example similarity matrix (304) indicates that the similarity score between column "2" of the example existing dataset and column "1*" of the example new dataset is "3". The example similarity matrix (304) indicates that the similarity score between column "2" of the example existing dataset and column "2*" of the example new dataset is "16".

As discussed above, performing global optimization using a similarity matrix to identify mappings between columns of existing datasets and columns of new datasets includes identifying mappings that result in the lowest total similarity score. Turning to the example similarity matrix (304) of FIG. 3.3, starting with column "1", column "1" may be mapped to column "1*" or column "2*" (depicted as rows in the example similarity matrix (304)). Similarly, column "2" may be mapped to column "1*" or column "2*". The mappings are exclusive, so if column "1" is mapped to column "1*", then column "2" cannot be mapped to column "1*" (i.e., column "2" must be mapped to column "2*"). Accordingly, there are to possible sets of mappings that may be generated using the example similarity matrix (304). The first set includes mapping column "1" to column "1*", and mapping column "2" to column "2*". The second set includes mapping column "1" to column "2*", and mapping column "2" to column "1*". The total similarity score for the first set of mappings is 17 (i.e., 1+16=17), while the total similarity score for the second set of mappings is 5 (i.e., 2+3=5). Using global optimization, the mappings identified for the example similarity matrix (304) would include the second set of mappings because the total similarity score associated with the second set of mappings is lower than the total similarity score of the first set of mappings.

Returning to the discussion of merging the new dataset (302) of FIG. 3.2 into the existing dataset (300) of FIG. 3.1, mappings between the columns of the existing dataset (300) and the new dataset (302) may be identified using one or more similarity matrices and global optimization. The mappings may include: (i) column "Customer" mapped to column "Company Name", (ii) column "State" mapped to column "State", (iii) column "Country" mapped to column "Country", (iv) column "Date" mapped to column "Close Date", and (v) column "Sale Value" mapped to column "Booking Amount".

After obtaining the mappings, data type specific validation is performed on the existing dataset (300) and the new dataset (302) using the mappings to identify matches, partial matches, and new items. Word data type specific validation is performed for the existing dataset (300) and the new dataset (302) associated with the first three mappings (i.e., included in the word data type group). The word data type specific validation results in the identification of a match for "Company A", and new items "Company G", "Company F", and "Company I" for the first mapping. The word data type specific validation results in the identification of a partial match between "Texas" and "TX", and new items "CA" and "NJ" for the second mapping. Additionally, the word data type validation identifies a common word format and changes "TX", "CA", and "NJ" of the new dataset (302) to "Texas", "California", and "New Jersey" respectively. The word data type specific validation results in the identification of partial matches between "US" and "United States" and between "Itily" and "Italy".

Date data type validation identifies a common date format for the fourth mapping. The common date format includes month-day-year, with year only including the final two digits of the year. As a result, the date data items of the "Date" column of the new dataset (302) are transformed to the common date format. Finally, numeric data type validation identifies all new items for the fifth mapping. Additionally, a common numeric formatting is identified. The common numeric formatting includes a dollar sign (e.g., "$") and only two decimal points. As a result, the numeric data items in the "Sale Value" column of the new data set (302) are transformed to the common numeric formatting.

A merge user interface (UI) is generated and provided to the user. The merge UI specifies the mappings, matches, partial matches, and new items generated during the merge operation. The user provides user indications specifying user preferences associated with the mappings, matches, partial matches, and new items. The user preferences specify that all mappings, matches, partial matches, and new items are accepted. As a result, the new dataset data items associated with the partial matches are changed to the associated existing dataset data items (e.g., "Itily" is changed to "Italy", "US" is changed to "United States", etc.). After that, the new dataset (302) is merged into the existing dataset (300) to generate the merged dataset (306) as shown in FIG. 3.4.

The merged dataset (306) includes five columns. The five columns include the following headers, respectively: "Company Name", "State", "Country", "Close Date", and "Booking Amount". The first column includes nine data items specifying company names: "Company A", "Company B", "Company C", "Company D", "Company E", "Company A", "Company G", "Company H", and "Company I". The second column includes six data items specifying states: "Texas", "Florida", "New York", "Texas", "California", and "New Jersey". The third column includes nine data items specifying a country: "United States", "United States", "United States", "Germany", "Italy", "United States", "United States", "United States", and "Italy". The fourth column includes nine data items specifying a close date: "Feb. 5, 2021", "Mar. 6, 2021", "Nov. 21, 2020", "Aug. 10, 2019", and "Sep. 10, 2021", "Feb. 20, 2021", "Mar. 26, 2021", "Nov. 21, 2020", and "Dec. 22, 2021". The fifth and last column includes nine data items specifying a booking amount: "$201,006.89", "$513,521.00", "$752,698.54", "$123457.63", "$458,123.45", "$301,006.89", "$613,521.00", "$852698.54", and "$652,697.54".

Moving to FIG. 3.5, FIG. 3.5 shows an example visual representation of a first page of a merge user interface (UI) generated during a merge operation. The merge operation is not related to the example merge operation discussed above with regard to FIGS. 3.1-3.4. The first page may include rows associated with mappings generated through the merging operation. The columns specify information associated with the mappings. The column headers include "Source file column" (e.g., new dataset column), "Target module dimension" (e.g., existing dataset column), "Matches", "New items", and "Partial matches". Each row may include the source file column, the target module dimension, the number of matches, the number of new items, and the number of partial matches associated with each corresponding mapping. The first row may include a source file column titled "City", a target module dimension titled "Location", 50 matches, 2 new items, and 1 partial match. The second row may include a source file column titled "Product name", a target module dimension titled "Products", 51 matches, 1 new item, and 1 partial match. The third row may include a source file column titled "Account", a target module dimension titled "Line items", 2 matches, 0 new items, and 0 partial matches. The fourth row may include a source file column titled "Column Headers", a target module dimension titled "Time", 24 matches, 0 new items, and 0 partial matches.

The first page of the merge UI further specifies the quantity of unmapped columns between the new dataset and the existing dataset. A user may interact with the first page of the merge UI (e.g., by clicking on a row with a mouse) to open up a second page of the merge UI to view additional details regarding the mappings identified during the merge operation as discussed below in FIG. 3.6.

FIG. 3.6 shows a diagram of a second page of the example merge UI discussed above in FIG. 3.5. The second page is opened by the user by clicking on the first row of the first page of the merge UI. The second page of the merge UI shows additional details of the "City" to "Location" mapping between the source file (i.e., new dataset) and the target module (i.e., existing dataset). The second page of the merge UI specifies each of the partial matches, the new items, and the matches. The partial matches specify that the source item "NY" (e.g., data item of "City") is mapped to (e.g., a partial match of) "New York" included in the target module dimension (e.g., "Location"). The second page of the merge UI provides a check box option as shown to allow the user to submit user indications that specify user preferences to accept the partial mapping.

The new items specify that the source items "London" and "San Francisco" (e.g., data items of "City") are not included in the target module dimension (e.g., "Location"). The second page of the merge UI provides a check box option as shown to allow the user to submit user indications that specify user preferences to accept the new mappings. Additionally, the matches included in the second page specify the items included in the source file that match items included in the target module. For example "Head Office", "New York", "Chicago", etc. The user may include the ability to scroll up and down on the second page of the merge UI to see all 50 matches. The user uses the merge UI of FIGS. 3.5-3.6 to view the results of the example merge operation comparisons and validations, and to input user preferences associated with the final merge operation.

End of Examples

Figure 4:
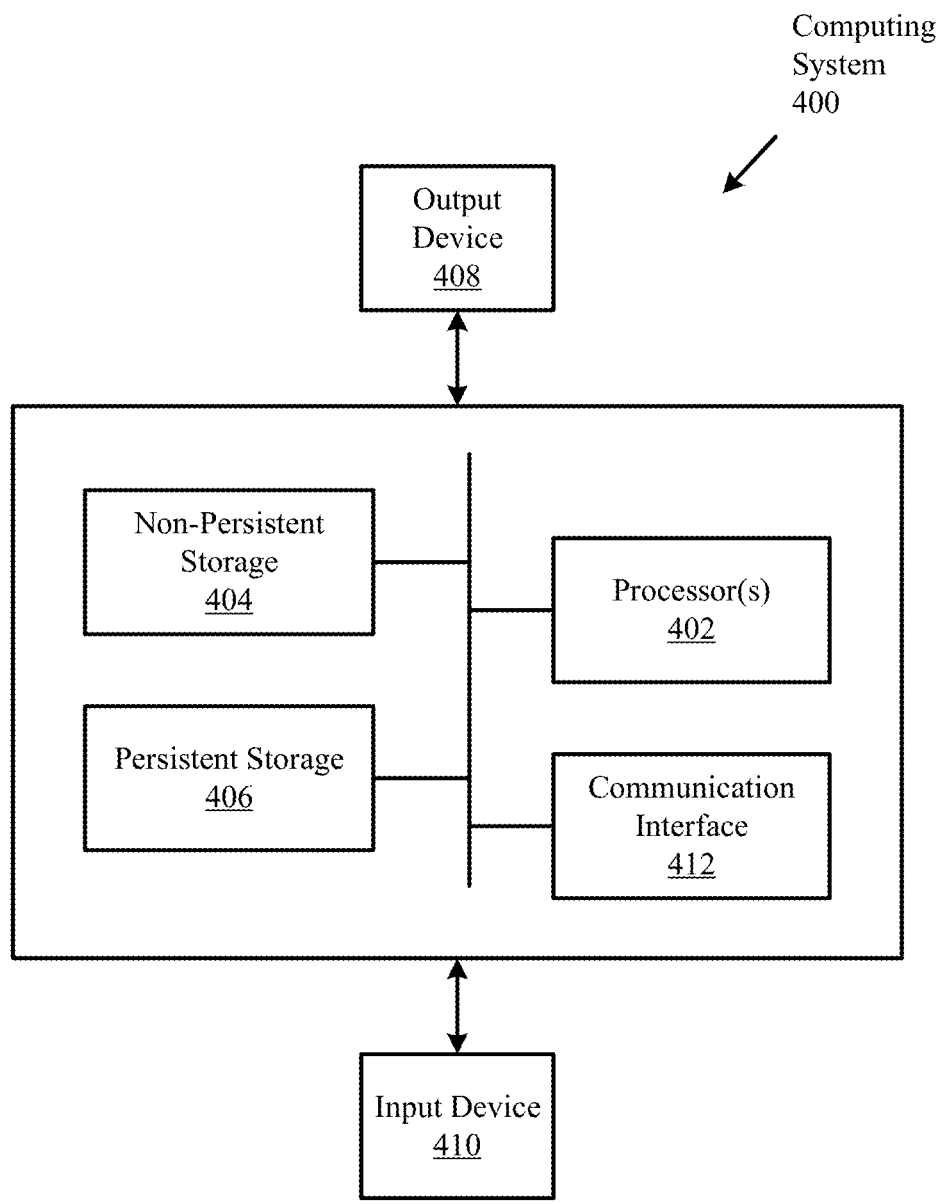
FIG. 4 shows a computer system in accordance to one or more embodiments.

FIG. 4 shows a computer system in accordance to one or more embodiments.

Embodiments disclosed herein may be implemented using computing devices and/or computing systems. FIG. 4 shows a diagram of a computing device in accordance with one or more embodiments disclosed herein. Computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor (s) (402) may be an integrated circuit for processing instructions. For example, the computer processor(s) may be one or more cores or micro-cores of a processor. Computing system (400) may also include one or more input devices (410), such as a touchscreen, keyboard, mouse, microphone, touchpad, electronic pen, or any other type of input device. Further, communication interface (412) may include an integrated circuit for connecting computing system (400) to a network (not shown) (e.g., a local area network (LAN), a wide area network (WAN) such as the Internet, mobile network, or any other type of network) and/or to another device, such as another computing system.

In one embodiment disclosed herein, computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

The problems discussed throughout this disclosure should be understood as being examples of problems solved by embodiments disclosed herein and the embodiments disclosed herein should not be limited to solving the same/similar problems. The disclosed embodiments are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

The invention claimed is:

1. A method for merging data, the method comprising:
obtaining an existing dataset and a new dataset associated with a dataset merge event;
grouping the new dataset and the existing dataset based on data types to obtain a plurality of data type groups, wherein the plurality of data type groups comprises a word data type group, a non-word data type group, a numeric data type group, and a date data type group;
performing, for each data type group of the plurality of data type groups, data type specific processing to generate similarity features;
generating, for each data type group of the plurality of data type groups, a similarity matrix using the similarity features to obtain a plurality of similarity matrices;
performing, for a data type group of the plurality of data type groups, a comparison between the existing dataset and the new dataset using the similarity matrix of the plurality of similarity matrices that corresponds to the data type group to identify mappings between the existing dataset and the new dataset,
wherein the comparison is performed using global optimization,
wherein performing the comparison using the global optimization comprises:
identifying a first set of mappings,
wherein the first set of mappings identifies a first pair of columns and a second pair of columns,
wherein the first pair consists of a first column in the new dataset and a first column in the existing dataset,
wherein the second pair consists of a second column in the new dataset and a second column in the existing dataset,
generating a similarity score for the first set of mappings,
identifying a second set of mappings,
wherein the second set of mappings identifies a third pair of columns and a fourth pair of columns,
wherein the third pair consists of the first column in the new dataset and the second column in the existing dataset, wherein the fourth pair consists of the second column in the new dataset and the first column in the existing dataset, generating a second similarity score for the second set of mappings, identifying the second set of mappings as the mappings by comparing the similarity score and the second similarity score, wherein the second similarity score is less than the similarity score;

performing, for each data type group of the plurality of data type groups, data type specific validation to obtain an updated existing dataset, an updated new dataset, matches, partial matches, and new items, wherein the partial matches comprise data items in the existing dataset that include similarities between corresponding data items in the new dataset that are above a similarity threshold;

obtaining user preferences associated with the mappings, the matches, the partial matches, and the new items associated with the plurality of data type groups; and generating merged data using the updated existing dataset, the updated new dataset, the mappings, the matches, the partial matches, the new items, and the user preferences.

2. The method of claim 1, wherein a mapping of the mappings specifies a merging relationship between a column of the new dataset and a column of the existing dataset.

3. The method of claim 1, wherein obtaining user preferences associated with the mappings, the matches, the partial matches, and the new items comprises:

generating a merge user interface (UI) using the updated existing dataset, the updated new dataset, the mappings, the matches, the partial matches, and the new items;

providing the merge UI to a user; and obtaining user indications associated with the merge UI, wherein the user indications specify the user preferences.

4. The method of claim 1, wherein the user preferences specify a user-desired action to perform during the generation of the merged data.

5. The method of claim 1, wherein:

the existing dataset comprises a first existing dataset of a plurality of existing datasets;

the new dataset comprises a first new dataset of a plurality of new datasets; and the dataset merge event specifies the merging of the plurality of new datasets with the plurality of existing datasets.

6. The method of claim 2, wherein performing, for each data type group of the plurality of data type groups, data type specific processing on the existing dataset and the new dataset to generate the similarity features comprises at least one of:

performing word data type processing on the existing dataset and the new dataset associated with the word data type group to generate a word similarity features;

performing non-word data type processing on the existing dataset and the new dataset associated with the non-word data type group to generate non-word similarity features;

performing numeric data type processing on the existing dataset and the new dataset associated with the numeric data type group to generate numeric similarity features; and performing date data type processing on the existing dataset and the new dataset associated with the date data type group to generate date similarity features.

7. The method of claim 6, wherein the similarity features comprise at least one of the word similarity features, the non-word similarity features, the numeric similarity features, and the date similarity features.

8. The method of claim 6, wherein performing, for each data type group of the plurality of data type groups, data type specific validation on the existing dataset and the new dataset to obtain the updated existing dataset, the updated new dataset, the matches, the partial matches, and the new items comprises at least one of:

performing word data type validation on the mappings between the existing dataset and the new dataset associated with the word data type group;

performing non-word data type validation on the mappings between the existing dataset and the new dataset associated with the non-word data type group;

performing numeric data type validation on the mappings between the existing dataset and the new dataset associated with the numeric data type group;

performing date data type validation on the mappings between the existing dataset and the new dataset associated with date data type group; and generating the updated existing dataset and the updated new dataset based on at least one of the data word data type validation, the non-word data type validation, the numeric data type validation, and the date data type validation.

9. A non-transitory computer readable medium comprising computer readable program code, which when executed by a computer processor enables the computer processor to perform a method for merging data, comprising:

obtaining an existing dataset and a new dataset associated with a dataset merge event;

grouping the new dataset and the existing dataset based on data types to obtain a plurality of data type groups, wherein the plurality of data type groups comprises a word data type group, a non-word data type group, a numeric data type group, and a date data type group;

performing, for each data type group of the plurality of data type groups, data type specific processing to generate similarity features;

generating, for each data type group of the plurality of data type groups, a similarity matrix using the similarity features to obtain a plurality of similarity matrices;

performing, for a data type group of the plurality of data type groups, a comparison between the existing dataset and the new dataset using the similarity matrix of the plurality of similarity matrices that corresponds to the data type group to identify mappings between the existing dataset and the new dataset, wherein the comparison is performed using global optimization, wherein performing the comparison using the global optimization comprises:

identifying a first set of mappings, wherein the first set of mappings identifies a first pair of columns and a second pair of columns, wherein the first pair consists of a first column in the new dataset and a first column in the existing dataset, wherein the second pair consists of a second column in the new dataset and a second column in the existing dataset, generating a similarity score for the first set of mappings, identifying a second set of mappings,
wherein the second set of mappings identifies a third pair of columns and a fourth pair of columns,
wherein the third pair consists of the first column in the new dataset and the second column in the existing dataset,
wherein the fourth pair consists of the second column in the new dataset and the first column in the existing dataset,
generating a second similarity score for the second set of mappings,
identifying the second set of mappings as the mappings by comparing the similarity score and the second similarity score, wherein the second similarity score is less than the similarity score;

performing, for each data type group of the plurality of data type groups, data type specific validation to obtain an updated existing dataset, an updated new dataset, matches, partial matches, and new items, wherein the partial matches comprise data items in the existing dataset that include similarities between corresponding data items in the new dataset that are above a similarity threshold;

obtaining user preferences associated with the mappings, the matches, the partial matches, and the new items associated with the plurality of data type groups; and generating merged data using the updated existing dataset, the updated new dataset, the mappings, the matches, the partial matches, the new items, and the user preferences.

10. The non-transitory computer readable medium of claim 9, wherein a mapping of the mappings specifies a merging relationship between a column of the new dataset and a column of the existing dataset.

11. The non-transitory computer readable medium of claim 9, wherein obtaining user preferences associated with the mappings, the matches, the partial matches, and the new items comprises:
generating a merge user interface (UI) using the updated existing dataset, the updated new dataset, the mappings, the matches, the partial matches, and the new items;
providing the merge UI to a user; and
obtaining user indications associated with the merge UI, wherein the user indications specify the user preferences.

12. The non-transitory computer readable medium of claim 9, wherein the user preferences specify a user-desired action to perform during the generation of the merged data.

13. The non-transitory computer readable medium of claim 10, wherein performing, for each data type group of the plurality of data type groups, data type specific processing on the existing dataset and the new dataset to generate the similarity features comprises at least one of:
performing word data type processing on the existing dataset and the new dataset associated with the word data type group to generate a word similarity features;
performing non-word data type processing on the existing dataset and the new dataset associated with the non-word data type group to generate non-word similarity features;
performing numeric data type processing on the existing dataset and the new dataset associated with the numeric data type group to generate numeric similarity features; and
performing date data type processing on the existing dataset and the new dataset associated with the date data type group to generate date similarity features.

14. The non-transitory computer readable medium of claim 13, wherein the similarity features comprise at least one of the word similarity features, the non-word similarity features, the numeric similarity features, and the date similarity features.

15. A computing device comprising:
a memory; and
a processor coupled to the memory, wherein the processor is configured to:
obtain an existing dataset and a new dataset associated with a dataset merge event;
group the new dataset and the existing dataset based on data types to obtain a plurality of data type groups, wherein the plurality of data type groups comprises a word data type group, a non-word data type group, a numeric data type group, and a date data type group;
perform, for each data type group of the plurality of data type groups, data type specific processing to generate similarity features;
generate, for each data type group of the plurality of data type groups, a similarity matrix using the similarity features to obtain a plurality of similarity matrices;
perform, for a data type group of the plurality of data type groups, a comparison between the existing dataset and the new dataset using the similarity matrix of the plurality of similarity matrices that corresponds to the data type group to identify mappings between the existing dataset and the new dataset,
wherein the comparison is performed using global optimization,
wherein performing the comparison using the global optimization comprises:
identifying a first set of mappings,
wherein the first set of mappings identifies a first pair of columns and a second pair of columns,
wherein the first pair consists of a first column in the new dataset and a first column in the existing dataset,
wherein the second pair consists of a second column in the new dataset and a second column in the existing dataset,
generating a similarity score for the first set of mappings,
identifying a second set of mappings,
wherein the second set of mappings identifies a third pair of columns and a fourth pair of columns,
wherein the third pair consists of the first column in the new dataset and the second column in the existing dataset,
wherein the fourth pair consists of the second column in the new dataset and the first column in the existing dataset,
generating a second similarity score for the second set of mappings, identifying the second set of mappings as the mappings by comparing the similarity score and the second similarity score, wherein the second similarity score is less than the similarity score;
perform, for each data type group of the plurality of data type groups, data type specific validation to obtain an updated existing dataset, an updated new dataset, matches, partial matches, and new items, wherein the partial matches comprise data items in the existing dataset that include similarities between corresponding data items in the new dataset that are above a similarity threshold;
obtain user preferences associated with the mappings, the matches, the partial matches, and the new items associated with the plurality of data type groups; and
generate merged data using the updated existing dataset, the updated new dataset, the mappings, the matches, the partial matches, the new items, and the user preferences.

16. The computing device of claim 15, wherein a mapping of the mappings specifies a merging relationship between a column of the new dataset and a column of the existing dataset.

17. The computing device of claim 16, wherein performing, for each data type group of the plurality of data type groups, data type specific processing on the existing dataset and the new dataset to generate the similarity features comprises at least one of:

performing word data type processing on the existing dataset and the new dataset associated with the word data type group to generate a word similarity features;

performing non-word data type processing on the existing dataset and the new dataset associated with the non-word data type group to generate non-word similarity features;

performing numeric data type processing on the existing dataset and the new dataset associated with the numeric data type group to generate numeric similarity features; and performing date data type processing on the existing dataset and the new dataset associated with the date data type group to generate date similarity features.

* * * * *